United States Patent [19]

Jones

[11] Patent Number: 5,338,461

[45] Date of Patent: * Aug. 16, 1994

[54] METHOD OF DISINFECTING A WATER SYSTEM WITH A DRY OXIDIZER COMPOSITION

[75] Inventor: Ronald L. Jones, Norcross, Ga.

[73] Assignee: Bio-Lab, Inc., Decatur, Ga.

[*] Notice: The portion of the term of this patent subsequent to May 14, 2008 has been disclaimed.

[21] Appl. No.: 950,907

[22] Filed: Sep. 24, 1992

Related U.S. Application Data

[63] Continuation of Ser. No. 596,462, Oct. 15, 1990, abandoned, which is a continuation-in-part of Ser. No. 431,824, Nov. 6, 1989, Pat. No. 5,015,643.

[51] Int. Cl.$^5$ .............................. C02F 1/76; C02F 1/68; A01N 43/66; A01N 59/00
[52] U.S. Cl. ................................... 210/755; 210/764; 514/241; 424/723
[58] Field of Search ..................... 514/241; 424/723; 422/37; 252/95; 210/755, 764

[56] References Cited

U.S. PATENT DOCUMENTS 4,557,926 12/1985 Nelson et al. ................. 424/723
4,755,354 7/1988 Trinh et al. ................... 422/37

*Primary Examiner*—Marianne M. Cintins
*Assistant Examiner*—K. Weddington
*Attorney, Agent, or Firm*—Woodard, Emhardt, Naughton, Moriarty & McNett

[57] ABSTRACT

Disclosed is a method of disinfecting a water system with a blue pigmented dry oxidizer composition consisting of:
(a) from 99.5–99.99% by weight of one of the following compositions:
 (i) 1,3 dichloro-5,5-dimethylhydantoin;
 (ii) a mixture of the 1-Bromo-3-chloro 5,5-dimethylhydantoin and 1,3-dichloro 5,5-dimethylhydantoin and 1,3-dichloro-5, ethyl-5-methylhydantoin;
 (iii) trichloro-s-triazinetrione;
 (iv) sodium dichloro-s-triazinetrione;
 (v) a mixture of trichloro-s-triazinetrione and sodium bromide;
 (vi) a mixture of sodium dichloro-s-triazinetrione and sodium bromide;
 (vii) 1-bromo-3-chloro-5,5-dimethylhydantoin;
 (viii) a mixture of 1,3-dichloro-5,5-dimethylhydantoin and potassium bromide;
 (ix) calcium hypochlorite
 (x) lithium hypochlorite
(b) and from 0.01–0.5% by weight of lazurite.

3 Claims, No Drawings

METHOD OF DISINFECTING A WATER SYSTEM WITH A DRY OXIDIZER COMPOSITION

This application is a continuation of application Ser. No. 07/596,462, filed Oct. 15, 1990, now abandoned, which is a continuation-in-part of U.S. patent application Ser. No. 431,824, filed Nov. 6, 1989, now U.S. Pat. No. 5,015,643.

FIELD OF THE INVENTION

This invention relates to adding a stable blue pigment to dry oxidizer compounds for disinfecting water systems such as swimming pools, spas, decorative fountains and recirculating water cooling systems.

BACKGROUND

There are a number of oxidizing compounds that are satisfactory for disinfecting water systems. It would be desirable to be able to incorporate a blue pigment in these compounds so that they could be identified as a disinfectant. It would be necessary for the pigment to be stable when incorporated in dry form with the compound. As these oxidizer compounds are used for disinfecting other systems such as swimming pools and spas, it is preferred that the pigment not be stable in the water system. Otherwise it might stain the walls of the swimming pool and spa even though it is used in very small amounts.

PRIOR ART

The use of the oxidizer compounds described in this invention are well known in the prior art. For example, bromo-hydantoins are disclosed in U.S. Pat. No. 3,575,865 (Burke et al) for use as an oxidizing agent in a bleaching composition. N-bromo-N-chloro-hydantoins compounds are disclosed as being useful as a bleach activator in U.S. Pat. No. 3,850,833 (Koceich et al). This cleanser composition consists of a bleach activator, pigment extender, pigment and a particulate carrier. The bleach activator can be an alkali metal bromide. Various glycols are used for the pigment extender and binder. This patent mentions that pigments in the blue through green range may be used. However, only the phthalocyanine pigments, such as chromophthal green are disclosed. These compositions are prepared by mixing a particulate carrier with a bleach activator. The pigment is then added and a pigment extender then mixed with it.

U.S. Pat. No. 3,519,569 (Diaz) discloses an abrasive scouring cleanser containing a hypochlorite liberating compound with an abrasive material, organic detergent and an alkali metal bromide. The hydantoins are included in the class of hypochlorite-generating components. Other hypochlorite-generating compounds are the alkali metal hypochlorite, such as lithium and sodium hypochlorite. U.S. Pat. No. 4,235,599 (Davis et al) discloses a bleaching composition consisting of a mixture of N, N-dichloro-substituted hydantoin compounds with sodium bromide.

The use of N-brominated-hydantoin as bleaching agents is disclosed in U.S. Pat. No. 4,382,799 (Davis et al).

U.S. Pat. No. 4,557,926 (Nelson et al) discloses a combination of an alkali metal salt of dichloroisocyanuric acid and either sodium bromide or potassium bromide for use in disinfecting toilets. U.S. Pat. No. 4,600,406 (Corte) discloses a process of bleaching using sodium bromide and sodium hypochlorite. Corte discloses the use of the chlorohydantoins in his bleaching method.

SUMMARY OF THE INVENTION

It is an object of the present invention to provide a blue pigment for conventional oxidizer compounds used for disinfecting water systems such as swimming pools and spas so that the compound can be identified as a disinfectant when it is in its dry form. It is a further object of this invention to provide a blue pigment that is not stable in the water system so that it does not stain the walls of swimming pools and spas. This has been achieved with certain oxidizers. It has been found that the pigment lazurite is stable when mixed in dry form with many of the conventional oxidizers used for disinfecting water systems. It has also been found that this pigment is not stable in the water system with certain oxidizers so that the water remains clear in color and does not stain the walls of pools and spas.

DESCRIPTION OF THE INVENTION

This invention provides a blue pigment for a number of conventional oxidizers used to disinfect water systems, with the pigment being stable in the dry form. When certain oxidizers are added to a water system, the pigment decomposes so that the water is not colored which would result in staining the walls of swimming pools and spas.

The following conventional oxidizers were utilized in treating water systems: 1,3 dichloro-5,5-dimethylhydantoin; a mixture of the 1-bromo-3-chloro 5,5-dimethylhydantoin and 1,3-dichloro 5,5-dimethylhydantoin and 1,3-dichloro-5, ethyl-5-methylhydantoin; trichloro-s-triazinetrione; sodium dichloro-s-triazinetrione; a mixture of trichloro-s-triazinetrione and sodium bromide; a mixture of sodium dichloro-s-triazinetrione and sodium bromide; 1-bromo-3-chloro-5,5-dimethylhydantoin; a mixture of 1,3-dichloro-5,5-5 -dimethylhydantoin and potassium bromide, calcium hypochlorite and lithium hypochlorite.

A chlorine stable pigment has been found which is stable in dry form with the above oxidizers. This pigment is ultramarine blue or lazurite, commonly sold under the trade name Pylam Pylaklor Dry Blue™* S-726 (Pigment Blue 29; CI 77007). It has the following composition [(Na, Ca)$_4$ (A1Si O$_4$)$_3$ (SO$_4$, S, Cl)] or [Ca$_2$Na$_6$ (A1$_6$(SiO$_4$)$_6$SO$_4$ S] or [Na$_5$(A1$_3$(SiO$_4$)$_3$ S] or [Na$_5$(A1$_3$(SiO$_4$)$_3$S) (C1). This pigment is blue, blue-violet or greenish-blue in color. Lazurite is oxidizer stable so that the solid composition is blue in color. Lazurite is decomposed by the oxidizer in the water systems when used in certain oxidizers as illustrated in Table 2. All of the oxidizers except mixture 4 and 6 in Table 2 decompose in water systems. Decomposition of the pigment in the water system is preferred because otherwise the pigment may result in a slight blue tint in the water. This is important for some applications as pigment might be objectionable to users of certain water systems such as swimming pools. *Trademark of Pylam Products Company, Inc.

The lazurite is added to the oxidizing compound in an amount of from 0.01–0.5% by weight. It is preferred that it be present in an amount of 0.05–0.25% by weight. One of the preferred compositions includes the trichloro-s-triazinetrione in an amount from 90-97% by weight and potassium bromide in an amount from 2.99–9.5% by weight and lazurite in an amount from 0.01–0.5% by weight The lazurite is added to the oxidizer by simple mixing. The oxidizer and pigment can be in granular or a pressed composition.

The lazurite pigment gives a distinctive blue color to the white oxidizer compound which is stable for a long period of time. However when the pigmented oxidizer is introduced into the water system, the pigment becomes unstable with certain oxidizers so the water is not colored blue. This is preferred to avoid staining the walls of swimming pools and spas.

It is also possible for the formulation to include a filler. The filler is an inert substance, such as sodium chloride or boric acid, that can be used to assist in the tablettability as a composition. A filler can be used in any concentration provided the composition contains the required amount of the disinfectant. The filler is preferably present from 5–10% by weight.

In addition to the components of the disinfectant described above, the formulation may also contain other ingredients, such as tabletting aids, e.g., mold release agents, binders, corrosion inhibitors, scale inhibitors and other components known to one skilled in the art. The tablets, sticks or pucks are formed in the usual manner.

Finding a stable blue pigment is important as it clearly identifies the oxidizer as a disinfectant suitable for use in water systems.

It is preferred that the blue pigmented oxidizers of this invention be compressed into solid form and used in a release device so that the disinfectant is immersed or partially immersed in water within an enclosure in which the disinfectant is gradually eroded and released to disinfect the water system. The composition can be pressed into tablets, sticks or pucks by well-known commercial devices.

EXAMPLE 1

The oxidizers set forth in Table 1 were each mixed with lazurite until a uniform blue mixture was obtained. The oxidizer was mixed in an amount of 99.8% by weight with 0.20% lazurite. After mixing these compositions were stored using a 35 day accelerated stability testing method. Compositions were stored at 50° C. The stability of the blue pigment in the composition was observed visually. The following results were obtained for each of the oxidizers:

TABLE 1

| OXIDIZER | Today | 35 days later | Stability of Pigment |
|---|---|---|---|
| 1. 1,3-dichloro-5, 5-dimethylhydantoin | Blue | Blue | Stable |
| 2. a mixture of 60% by weight of the 1-bromo-3-chloro-5, 5-dimethylhydantoin and 27.4% weight of the 1,3-dichloro-5,5-dimethylhydantoin and 10.6% of the 1,3-dichloro-5, ethyl-5-methylhydantoin and 2.0% inert substances. | Blue | Blue | Stable |
| 3. trichloro-s-triazinetrione (TCCA) | Blue | Blue | Stable |
| 4. sodium dichloro-s-triazinetrione | Blue | Blue | Stable |

TABLE 1-continued

| OXIDIZER | Today | 35 days later | Stability of Pigment |
|---|---|---|---|
| 5. a mixture of the trichloro-striazinetrione of 96% by weight and 4% by weight of sodium bromide | Blue | Blue | Stable |
| 6. a mixture of 85% by weight of sodium dichloro-striazinetrione and 15% by weight of sodium bromide | Blue | Blue | Stable |
| 7. 1-Bromo-3-chloro 5, 5-dimethyldantoin | Blue | Blue | Stable |
| 8. a mixture of 96% by weight of 1,3-dichloro 5,5-dimethylhydantoin and 4% by weight of potassium bromide | Blue | Blue | Stable |
| 9. calcium hypochlorite | Blue | Blue | Stable |
| 10. lithium hypochlorite | Blue | Blue | Stable |

EXAMPLE 2

The stability of the lazurite pigment in each of the disinfecting compositions set forth in Example 1 was tested by placing 0.5 gm of each composition in 1,000 gm of distilled water. An additional 0.1 gm of lazurite pigment was added to the water for visual effect. The disinfectant composition was allowed to mix in the water for a 24 hour period. The results of the test are set forth in Table 2. The oxidizer numbers used in Table 1 are used here for reference.

TABLE 2

| OXIDIZER | Pigment Color Time of Mixinq | Pigment Color 1.5 hrs later | Pigment Color 24 hrs later |
|---|---|---|---|
| 1. | Blue | Blue | Colorless |
| 2. | Blue | Blue | Colorless |
| 3. | Blue | Colorless | Colorless |
| 4. | Blue | Blue | Blue |
| 5. | Blue | Colorless | Colorless |
| 6. | Blue | Blue | Blue |
| 7. | Blue | Blue | Colorless |
| 8. | Blue | Blue | Colorless |
| 9. | Blue | Colorless | Colorless |
| 10. | Blue | Colorless | Colorless |

We claim:

1. A method of disinfecting a water system using an oxidizer composition, wherein said oxidizer composition has a distinctive color prior to addition to the water, said method comprising adding a blue pigmented, dry oxidizer composition consisting essentially of (a) 99.5–99.99% by weight of a halogen releasing compound selected from the group consisting of trichloro-s-triazinetrione, sodium dichloro-s-triazinetrione, a mixture of trichloro-s-triazinetrione and sodium bromide, and a mixture of sodium dichloro-s-triazinetrione and sodium bromide, and (b) 0.01–0.5% by weight of lazurite, to the water system, wherein the lazurite when decomposed in the water does not add a blue color to the water, and wherein said dry oxidizer composition is color-stable when dry.

2. The method of claim 1 in which said composition consists of said halogen releasing compound and said lazurite.

3. The method of claim 1 in which said composition is pressed into the solid form of a tablet, stick or puck, and in which said adding comprises eroding the solid form composition into the water system.

* * * * *

UNITED STATES PATENT AND TRADEMARK OFFICE
CERTIFICATE OF CORRECTION

PATENT NO. : 5,338,461

DATED : August 16, 1994

INVENTOR(S) : Jones

It is certified that error appears in the above-identified patent and that said Letters Patent is hereby corrected as shown below:

In column 2, line 40, please change "1,3-dichloro-5,5-5" to --1,3-dichloro-5,5- --

In column 3, TABLE 1, please make changes in numbers 3, 5 and 6 as indicated below:

3. Change "trichloro-striazine-" to -- trichloro-s-triazine- --
     (in line 1 of #3)
5. Change "chloro-striazinetrione" to -- chloro-s-triazinetrione --
     (in line 2 of #5)
6. Change "dichloro-striazine-" to -- dichloro-s-triazine- --
     (in line 3 of #6)

Signed and Sealed this

Twenty-second Day of November, 1994

Attest:

BRUCE LEHMAN

Attesting Officer

Commissioner of Patents and Trademarks